(12) United States Patent (10) Patent No.: US 10,021,182 B2
Liang et al. (45) Date of Patent: Jul. 10, 2018

(54) METHOD AND APPARATUS FOR DATA SYNCHRONIZATION

(71) Applicant: GUANGZHOU UCWEB COMPUTER TECHNOLOGY CO., LTD., Guangzhou (CN)

(72) Inventors: Jie Liang, Guangzhou (CN); Jianjun Li, Guangzhou (CN); Zheng Tang, Guangzhou (CN); Yaojia Wang, Guangzhou (CN); Xiang Su, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 378 days.

(21) Appl. No.: 14/981,078

(22) Filed: Dec. 28, 2015

(65) Prior Publication Data

US 2016/0134695 A1 May 12, 2016

Related U.S. Application Data

(63) Continuation of application No. PCT/CN2013/089528, filed on Dec. 16, 2013.

(30) Foreign Application Priority Data

Jun. 28, 2013 (CN) .......................... 2013 1 0268827

(51) Int. Cl.
 *G06F 15/173* (2006.01)
 *H04L 29/08* (2006.01)
 *H04L 29/06* (2006.01)
(52) U.S. Cl.
 CPC .......... *H04L 67/1095* (2013.01); *H04L 67/42* (2013.01)

(58) Field of Classification Search
 CPC ........................... H04L 67/1095; H04L 67/42
 See application file for complete search history.

(56) References Cited

U.S. PATENT DOCUMENTS

| 2006/0075105 | A1 | 4/2006 | Momtchilov |
| 2006/0126620 | A1* | 6/2006 | Bonar ....................... G06F 8/35 |
| | | | 370/389 |
| 2009/0157802 | A1* | 6/2009 | Kang ................ G06F 17/30581 |
| | | | 709/203 |

FOREIGN PATENT DOCUMENTS

| CN | 101009516 A | 8/2007 |
| CN | 102508834 A | 6/2012 |

(Continued)

OTHER PUBLICATIONS

International Written Opinion for PCT/CN2013/089528, dated Mar. 20, 2014.

(Continued)

*Primary Examiner* — John B Walsh (57) ABSTRACT

A method for data synchronization performed by a server is described. The method comprises receiving, from a client terminal, a synchronization request and information about a synchronization anchor of the client terminal; determining, based on the synchronization anchor of the client terminal and a synchronization anchor of the server, difference data to be synchronized with the client terminal; determining whether a size of the difference data exceeds a threshold; and responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

20 Claims, 8 Drawing Sheets

(56) References Cited

FOREIGN PATENT DOCUMENTS

| | | |
|---|---|---|
| CN | 102915325 A | 2/2013 |
| CN | 103354560 A | 10/2013 |
| WO | WO 2014/206034 A1 | 12/2014 |

OTHER PUBLICATIONS

International Preliminary Report on Patentability for PCT/CN2013/089528, dated Dec. 29, 2015, 9 pages.
First Notice issued by China State Intellectual Property Office, dated Oct. 26, 2015 for Chinese Patent Application No. 201310268827.6 with search report.
Second Notice issued by China State Intellectual Property Office, dated Jul. 20, 2016 for Chinese Patent Application No. 2013102688276.0.
Third Notice issued by China State Intellectual Property Office, dated Dec. 5, 2016 for Chinese Patent Application No. 201310268827.6.
PCT International Search Report dated Mar. 20, 2014, issued in corresponding International Application No. PCT/CN2013/089528 (5 pages).

* cited by examiner

METHOD AND APPARATUS FOR DATA SYNCHRONIZATION

CROSS-REFERENCE TO RELATED APPLICATION

This application is continuation application of International Application No. PCT/CN2013/089528, filed Dec. 16, 2013, which is based upon and claims priority to Chinese Patent Application No. 201310268827.6, filed Jun. 28, 2013. The entire contents of above referenced applications are incorporated herein by reference.

TECHNICAL FIELD

The present disclosure generally relates to the field of data processing technology and, more particularly, to a method and an apparatus for data synchronization.

BACKGROUND

With on-going development in mobile communication network technologies and computer technologies, there are also ever-increasing demands for improved functionalities and performances for communication and computing devices. One of such functionalities is the capability of sharing remote data between a plurality of terminal devices and platforms over a network. Data synchronization technologies facilitate the sharing of data. For example, Synchronization Markup Language (SyncML) allows data synchronization among different types of devices. For example, a user can access e-mails on a mobile phone, and can modify, update and maintain the e-mails that have been accessed. After data synchronization, when attempting to access the emails from a different device (e.g., a computer), the user can then receive information about which of the emails have not been accessed.

SyncML is a mobile data synchronization protocol that is widely adopted in the industry. SyncML is developed and promoted by SyncML Initiative as an open standard for data synchronization. SyncML can be regarded as a common standard in the field of data synchronization field, covering types and processes of data synchronization.

Figure 1:
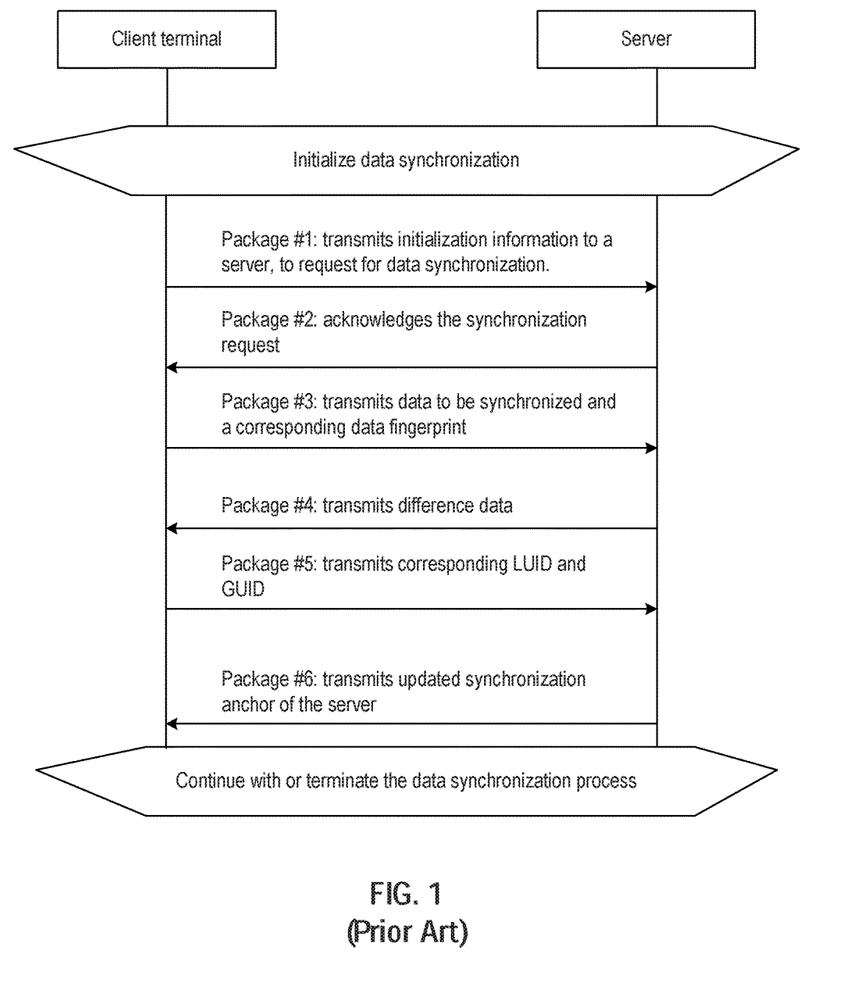
FIG. 1 is a flowchart illustrating a process of data synchronization under the SyncML protocol.

FIG. 1 illustrates a data synchronization process under the SyncML protocol.

As shown in FIG. 1, a data synchronization process under the SyncML protocol can be divided into six packages:

Package #1: A client terminal transmits initialization information to a server, to request for data synchronization. The initialization information can include a current synchronization anchor of the client terminal and a synchronization type. The synchronization anchor can be synchronization mark and may or may not be related to the contents of the data to be synchronized.

Package #2: The server acknowledges the synchronization request to the client terminal. The server further acknowledges the synchronization type to be adopted by both parties. The synchronization type can include, for example, two-way synchronization, slow synchronization, etc.

Package #3: The client terminal transmits data to be synchronized and a corresponding data fingerprint to the server. The data fingerprint can be used to identify the data to be synchronized.

Package #4: The server processes the data to be synchronized sent from the client terminal and determines difference data between the client terminal and the server. The difference data can correspond to a difference between the current synchronization anchor of the client terminal (transmitted in Package #1) and a synchronization anchor in the server. The server can transmit the difference data, and the corresponding fingerprint, to the client terminal.

Package #5: The client terminal processes the difference data delivered by the server, and uploads a processing result and a pair of corresponding local unique identifier (LUID) and global unique identifier (GUID) to the server. The LUID can be a unique identifier of the data at the client terminal, and the GUID can be a unique identifier to identify that data at the server.

Package #6: the server acknowledges an operation result of the client terminal and records a mapping relationship between the GUIDs and the LUIDs, and then sends a result indicating whether the data synchronization is successful, and the current latest synchronization anchor, to the client terminal.

When the client terminal receives the acknowledgement result in the Package #6 message package, the client terminal can record the synchronization anchor, which is associated with a current version of the data. The recording of the synchronization anchor can indicate that the data synchronization is successful, and that the client terminal and the server store the same data.

It can be seen from the synchronization process of the SyncML protocol that, if more data are to be synchronized, which can lead to a larger volume of difference data being transmitted in the Package #4 message package, the synchronization process can require more time, and can affect user experience. In addition, uncertainties in network transmission caused by, for example, network instability, gateway timeout, etc., can increase the likelihood of data synchronization failure, which can further degrades user experience.

SUMMARY

As discussed above, when more data is to be synchronized, the time for the data synchronization and the likelihood of failure can increase. An objective of the present disclosure is to provide a method and an apparatus for data synchronization, where a synchronization process of a piece of data can be divided into multiple synchronizations of segments of the piece of data, to improve user experience.

The present disclosure provides a method for data synchronization, the method being performed by a server. The method comprising: receiving, from a client terminal, a synchronization request and information about a synchronization anchor of the client terminal; determining, based on the synchronization anchor of the client terminal and a synchronization anchor of the server, difference data to be synchronized with the client terminal; determining whether a size of the difference data exceeds a threshold; and responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

In some embodiments, the method further comprises: determining an intermediate synchronization anchor based on the synchronization anchor of the client terminal and the synchronization anchor of the server; transmitting, to the client terminal, a first data segment that corresponds to a difference between the synchronization anchor of the client terminal and the intermediate synchronization anchor; and transmitting, to the client terminal, the intermediate synchronization anchor, wherein transmission of the intermediate synchronization anchor enables the client terminal to update the synchronization anchor of the client terminal to match with the intermediate synchronization anchor.

In some embodiments, the method further comprises: transmitting, to the client terminal, a first message to indicate that more data is to be transmitted to the client terminal after the transmission of the first data segment.

In some embodiments, the method further comprises: transmitting, to the client terminal, a second data segment that corresponds to a difference between the intermediate synchronization anchor and the synchronization anchor of the server; and transmitting, to the client terminal, the synchronization anchor of the server, wherein transmission of the synchronization anchor of the server enables the client terminal to update the synchronization anchor of the client terminal to match with the synchronization anchor of the server.

In some embodiments, the method further comprises: updating the intermediate synchronization anchor based on at least one of: an updated synchronization anchor of the server and an updated synchronization anchor of the client terminal.

In some embodiments, the method further comprises: receiving, from the client terminal, data to be synchronized with the server; and updating the synchronization anchor of the server based on a size of received data.

In some embodiments, the data to be synchronized with the server is transmitted in a plurality of data segments, wherein a size of each of the plurality of the difference data segments does not exceed the threshold, and wherein the synchronization anchor is updated when receiving each of the plurality of data segments.

In some embodiments, the method further comprises: receiving, from the client terminal, a second message to indicate that more data is to be received from the client terminal after the receiving, from the client terminal, the data to be synchronized with the server.

In some embodiments, the synchronization anchor of the server is independent from the synchronization anchor of the client terminal before receiving, from the client terminal, the synchronization request and information about the synchronization anchor of the client terminal.

Embodiments of the present disclosure also provide a non-transitory computer readable medium that stores a program that, when executed by a processor, causes the processor to perform the aforementioned method for data synchronization.

Embodiments of the present disclosure also provide a server for data synchronization. The server includes a memory that stores a set of instructions, and one or more processors configured to execute the instructions to cause the server to perform: receiving, from a client terminal, a synchronization request and information about a synchronization anchor of the client terminal; determining, based on the synchronization anchor of the client terminal and a synchronization anchor of the server, difference data to be synchronized with the client terminal; determining whether a size of the difference data exceeds a threshold; and responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

In some embodiments, the one or more processors are configured to execute the instructions to cause the server to perform: determining an intermediate synchronization anchor based on the synchronization anchor of the client terminal and the synchronization anchor of the server; transmitting, to the client terminal, a first data segment that corresponds to a difference between the synchronization anchor of the client terminal and the intermediate synchronization anchor; and transmitting, to the client terminal, the intermediate synchronization anchor, wherein transmission of the intermediate synchronization anchor enables the client terminal to update the synchronization anchor of the client terminal to match with the intermediate synchronization anchor.

In some embodiments, the one or more processors are configured to execute the instructions to cause the server to perform: transmitting, to the client terminal, a first message to indicate that more data is to be transmitted to the client terminal after the transmission of the first data segment.

In some embodiments, the one or more processors are configured to execute the instructions to cause the server to perform: transmitting, to the client terminal, a second data segment that corresponds to a difference between the intermediate synchronization anchor and the synchronization anchor of the server; and transmitting, to the client terminal, the synchronization anchor of the server, wherein transmission of the synchronization anchor of the server enables the client terminal to update the synchronization anchor of the client terminal to match with the synchronization anchor of the server.

In some embodiments, the one or more processors are configured to execute the instructions to cause the server to perform: updating the intermediate synchronization anchor based on at least one of: an updated synchronization anchor of the server and an updated synchronization anchor of the client terminal.

In some embodiments, the one or more processors are configured to execute the instructions to cause the server to perform: receiving, from the client terminal, data to be synchronized with the server; and updating the synchronization anchor of the server based on a size of received data.

In some embodiments, the one or more processors are configured to execute the instructions to cause the server to perform: receiving, from the client terminal, data to be synchronized with the server; and updating the synchronization anchor of the server based on a size of received data. The data to be synchronized with the server is transmitted in a plurality of data segments, wherein a size of each of the plurality of the difference data segments does not exceed the threshold, and wherein the synchronization anchor is updated when receiving each of the plurality of data segments.

With embodiments of the present disclosure, the synchronization data can be divided into segments, and separate synchronization processes can be performed for each data segment. As a result, the synchronization process can become more manageable and more stable even when operating uncertain network conditions.

Embodiments of the present disclosure also provide a non-transitory computer readable medium that stores a program that, when executed by a processor, causes the processor to perform a method for data synchronization, the method comprising receiving, from a client terminal, a synchronization request and information about a synchronization anchor of the client terminal; determining, based on the synchronization anchor of the client terminal and a synchronization anchor of the server, difference data to be synchronized with the client terminal; determining whether a size of the difference data exceeds a threshold; and responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

It is to be understood that both the foregoing general description and the following detailed description are exemplary and explanatory only and are not restrictive of the disclosed embodiments, as claimed.

DESCRIPTION OF THE EMBODIMENTS

As discussed above, under current data synchronization technology, when more data is to be synchronized, the time for the data synchronization and the likelihood of failure can increase. An objective of the present disclosure is to provide a method and an apparatus for data synchronization, where a synchronization process of a piece of data can be divided into multiple synchronizations of segments of the piece of data, to solve the aforementioned problem.

Reference will now be made in detail to methods and specific implementations that seek to overcome the foregoing shortcomings of current systems and methods. According to some embodiments of the present disclosure, a method for data synchronization performed by a server is provided. The method comprises receiving, from a client terminal, a synchronization request and information about a synchronization anchor of the client terminal; determining, based on the synchronization anchor of the client terminal and a synchronization anchor of the server, difference data to be synchronized with the client terminal; determining whether a size of the difference data exceeds a threshold; and responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

With embodiments of the present disclosure, the synchronization data can be divided into segments, and separate synchronization processes can be performed for each data segment. As a result, the synchronization process can become more manageable and more stable even when operating uncertain network conditions.

Examples of these implementations are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 2A:
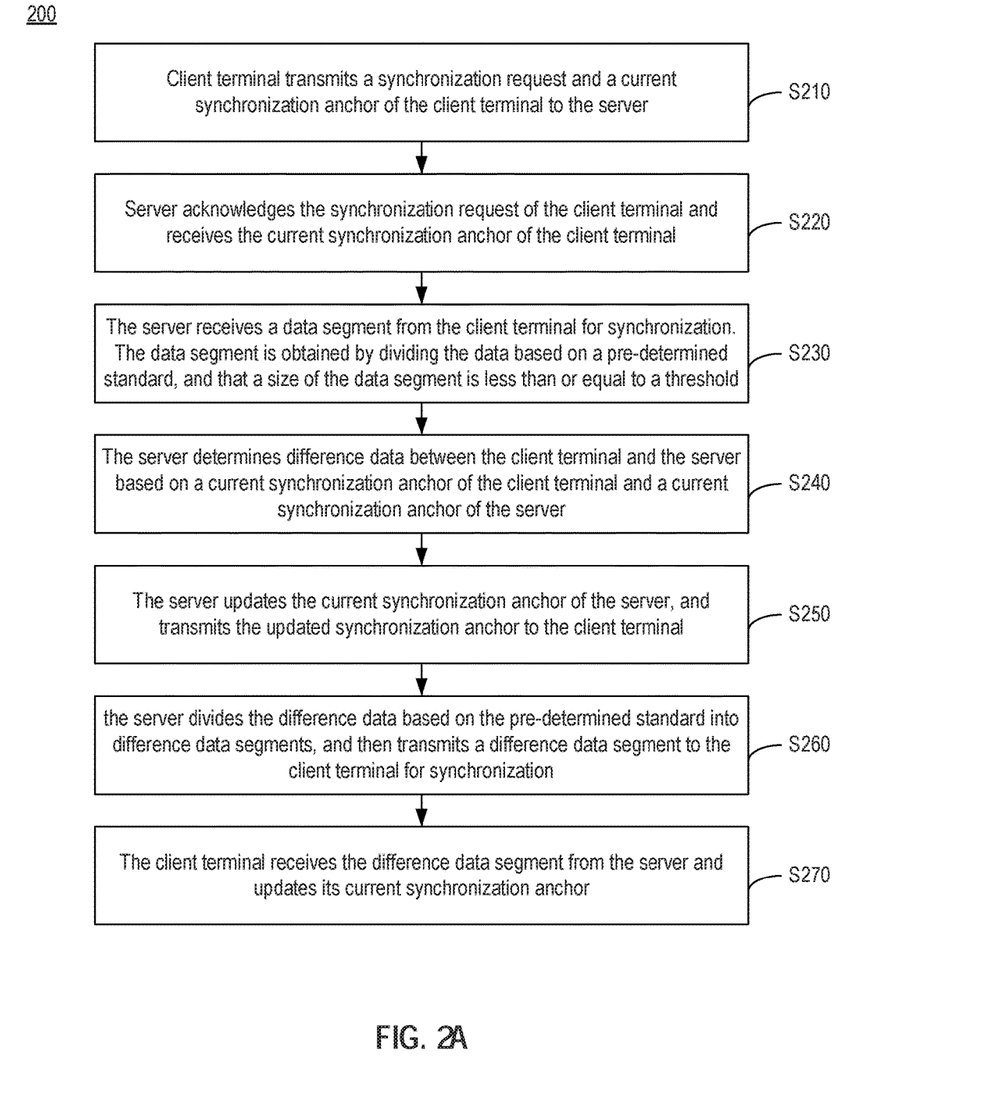
FIGS. 2A-B are flowcharts illustrating methods of data synchronization, consistent with embodiments of the present disclosure.

FIG. 2A is a flowchart illustrating an exemplary method 200 of data synchronization, consistent with embodiments of the present disclosure. As shown in FIG. 2A, method 200 include steps S210-S270. The method can be performed by a server and a client terminal when at least one of them has data to be synchronized with the other party.

In step S210, the client terminal transmits a synchronization request, and a current synchronization anchor of the client terminal, to the server. In a case where synchronization has never been performed before, the synchronization anchors at both the client terminal and at the server can be initialized to be zero.

In step S220, the server acknowledges the synchronization request of the client terminal and receives the current synchronization anchor of the client terminal.

In step S230, the server receives a data segment from the client terminal for synchronization. The data segment is part of the data to be synchronized between the server and the client terminal. The client terminal can obtain the data segment by dividing the data based on a pre-determined standard, and that a size of the data segment is less than or equal to a threshold.

For example, the pre-determined standard can be as follows: when a size of the data to be synchronized between the client terminal and the server exceeds N, the data can be segmented such that a size of each data segment in each batch is not over N. Each of the data segments can then be synchronized separately.

In step S240, the server determines difference data between the client terminal and the server based on a current synchronization anchor of the client terminal and a current synchronization anchor of the server.

In step S250, the server updates the current synchronization anchor of the server, and transmits the updated synchronization anchor to the client terminal. After the server receives a data segment from the client terminal, a corresponding data segment in the server is updated and synchronized based on the data segment transmitted by the client terminal. The server can also increment the current synchronization anchor to reflect the updating of the data segment, and transmit the updated synchronization anchor to the client terminal, thereby completing the synchronization process for that data segment. The transmission of the updated synchronization anchor to the client terminal enables the client terminal to update its own synchronization anchor to match with the server.

In step S260, when a size of the difference data (between the server and the client terminal) exceeds the predetermined threshold, the server divides the difference data based on the pre-determined standard into difference data segments, and then transmits a difference data segment to the client terminal for synchronization. The server also transmits an intermediate synchronization anchor that corresponds to the segmented difference data to the client terminal.

In step S270, the client terminal receives the difference data segment from the server and updates its current synchronization anchor.

As an illustrative example, assuming the current synchronization anchor of the client terminal is 2, while the current synchronization anchor of the server is 4, which can indicate that the server has difference data that needs to be synchronized with the client terminal. If the client terminal does not have data to be synchronized with the server, the server can determine, based on the difference between the synchronization anchors of the server and the client terminal, that a size of the difference data is 5. Assuming also the pre-determined standard allows a synchronization of data of maximum size of 3. In this case, the server can set an intermediate synchronization anchor at 3, and then divide the difference data into two difference data segments. After synchronization of the first difference data segment completes, the server can transmit the intermediate synchronization anchor (3) to the client terminal, which can then update its current synchronization anchor to 3. And then, after synchronization of the second difference data segment, the server then transmit its current synchronization anchor (4) to the client terminal, which can then update its current synchronization anchor to 4, which can indicate that the synchronization of these two difference data segments have been completed.

Method 200 can be performed by a server and a client terminal when at least one of them has data to be synchronized with the other party. In a case where both parties have data to be synchronized and determines the data sizes exceed the pre-determined threshold (e.g., during the generation of data packets), both parties can divide their data into data segments for separate synchronization processes. For example, the client terminal divides its data to be synchronized with the server into data segments, with a size of each data segment not exceeding the pre-determined threshold, and transmit the data segments to the server. Based on the data segment received from the client terminal, the server can update its current synchronization anchor, and determine difference data between the client terminal and the server. The server can then transmit the difference data to the client terminal. In a case where a size of the difference data exceeds the pre-determined threshold, the server can also, in step S260, divide the difference data into segments, and transmit the difference data segments, and the corresponding immediate synchronization anchors, to the client terminal for synchronization.

In some embodiments, after transmitting a difference data segment to the client terminal, the server can also transmit a message that indicates that there are more difference data segments to be synchronized. Based on the message, the client terminal can transmit a second synchronization request to the server to receive subsequent difference data segments, until the current synchronization anchors of the server and of the client terminal are identical.

Figure 2B:
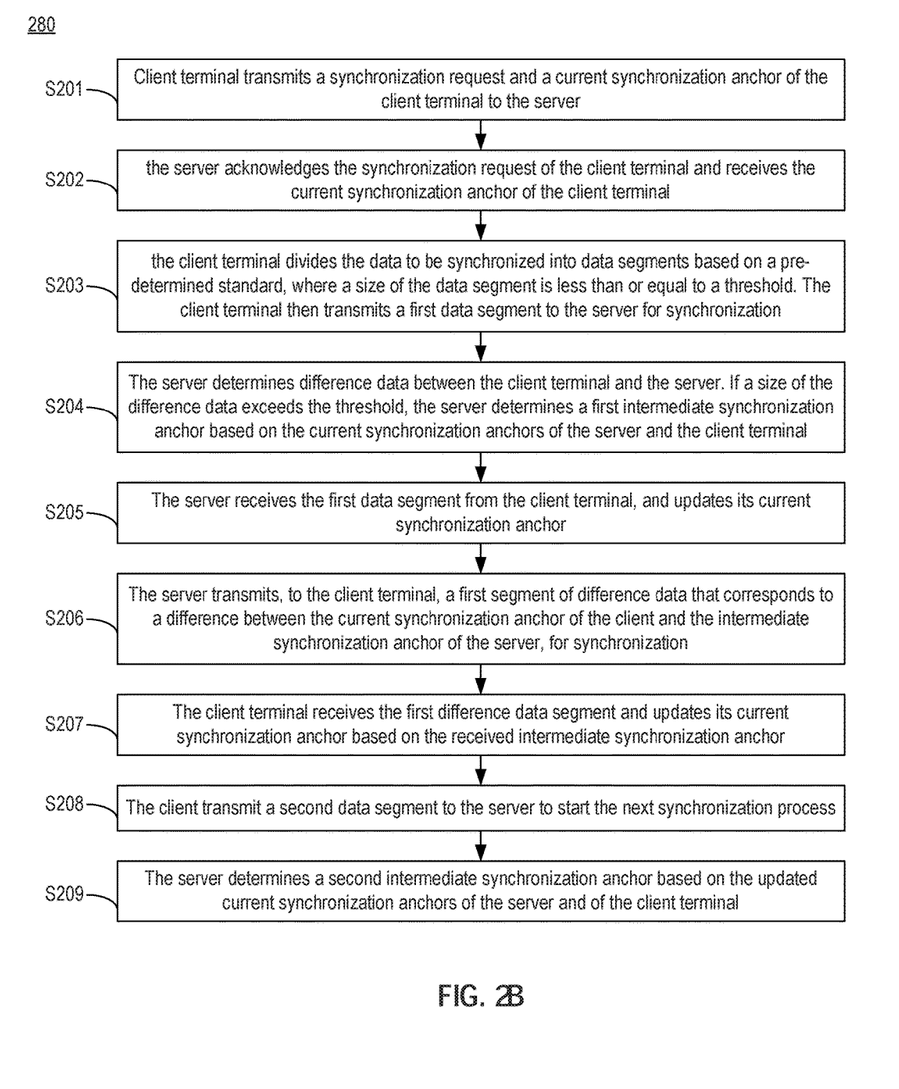

FIG. 2B is a flowchart illustrating an exemplary method 280 of data synchronization, consistent with embodiments of the present disclosure. As shown in FIG. 2A, method 280 include steps S201-S209. The method can be performed by a server and a client terminal where both of them have data to be synchronized with the other party.

In step S201, the client terminal transmits a synchronization request, and a current synchronization anchor of the client terminal, to the server.

In step S202, the server acknowledges the synchronization request of the client terminal and receives the current synchronization anchor of the client terminal.

In step S203, the client terminal divides the data to be synchronized into data segments based on a pre-determined standard, where a size of the data segment is less than or equal to a threshold. The client terminal then transmits a first data segment to the server for synchronization.

In step S204, the server determines difference data between the client terminal and the server. If a size of the difference data exceeds the threshold, the server determines a first intermediate synchronization anchor based on the current synchronization anchors of the server and the client terminal.

In step S205, the server receives the first data segment from the client terminal, and updates its current synchronization anchor.

In step S206, the server transmits, to the client terminal, a first segment of difference data that corresponds to a difference between the current synchronization anchor of the client and the intermediate synchronization anchor of the server, for synchronization.

In step S207, the client terminal receives the first difference data segment and updates its current synchronization anchor based on the received intermediate synchronization anchor, thereby completing a synchronization process involving the first data segment from the client terminal and the first difference data segment from the server.

After completion of step S207, the client terminal can then proceed to step S208 to transmit a second data segment to the server to start the next synchronization process.

In step S209, the server determines a second intermediate synchronization anchor based on the updated current synchronization anchors of the server (updated in step S205) and of the client terminal (updated in step S207). The server and the client terminal can then repeat steps S205-S209 until the server and the client terminal have identical data.

As an illustrative example, suppose that the current synchronization anchor of the client terminal is 4 and the synchronization anchor of the server is 8, and that the client terminal has six pieces of data (assumed as a, b, c, d, e, f) to be synchronized with the server. Suppose also that the predetermined standard defines that no more than three pieces of data can be transmitted for synchronization at a time.

First, in step S201, the client terminal transmits to a server a synchronization request and a current synchronization anchor of the client terminal. And then in step S202, the server acknowledges the synchronization request of the client terminal, and receives the current synchronization anchor of the client terminal (4).

Next, in step S203, the client terminal determines the six pieces of data exceeds the predetermined threshold, and divides the six pieces of data into two segments, with first data segment including data a, b, and c, and the second data segment including data d, e, and f. The client terminal then transmits the first data segment.

In step S204, before the server receives the first data segment, the server determines difference data based on the current synchronization anchors of the client terminal (4) and of the server (8). Based on a determination that a size of the difference data exceeds the pre-determined threshold, the server can determine, based on the current synchronization anchors of the client terminal (4) and the server (8), a first intermediate synchronization anchor as 6.

In step S205, the server receives the first data segment from the client terminal, and updates its current synchronization anchor to be 9.

In step S206, the server transmits first difference data segment that corresponds to a difference between the current synchronization anchor of the client (4) and the first intermediate synchronization anchor of the server (6). In some embodiments, the server also transmits a message to the client terminal to indicate that there is more difference data in addition to the first difference data segment to be synchronized with the client terminal.

In step S207, the client terminal receives the first difference data segment from the server, and updates its current synchronization anchor according to the first intermediate synchronization anchor, at 6.

In step S208, the client terminal transmits the second data segment (d, e, and f) to the server. And then in step 209, the server, before receiving the second data segment, generates a second intermediate synchronization anchor (8) based on the current synchronization anchor of the client terminal (6) and of the server (9).

And then steps S205-S209 can be repeated. For example, after the server receives the second data segment, it updates its current synchronization anchor to become 10, in step S205. The server also transmits, to the client terminal, a second difference data segment that correspond to the current synchronization anchor of the client terminal (6) and the second intermediate synchronization anchor (8) for synchronization, in step S206. In some embodiments, the server also transmits a message to indicate that there is more difference data in addition to the first difference data segment to be synchronized with the client terminal in step s206.

The client terminal then receives the second difference data segment, and updates its current synchronization anchor as 8, based on the received second intermediate synchronization anchor, in step S207. At this point, the client terminal has transmitted all of the data to be synchronized with the server, but the synchronization process continues because the server has not completed the transmission of difference data to the client terminal.

The server then determines a third difference data segment that corresponds to a difference between the second intermediate synchronization anchor (8) and the current synchronization anchor of the server (10), in step 209. In a case where a size of the third difference data segment does not exceed the pre-determined threshold, the server can transmit the third difference data segment to the client terminal, and transmit a message to indicate that no more difference data is to be sent.

After receiving the third difference data segment, the client terminal can update its current synchronization anchor to become 10. With the current synchronization anchors of the server and of the client terminal being equal, the synchronization process can be completed.

Figure 3A:
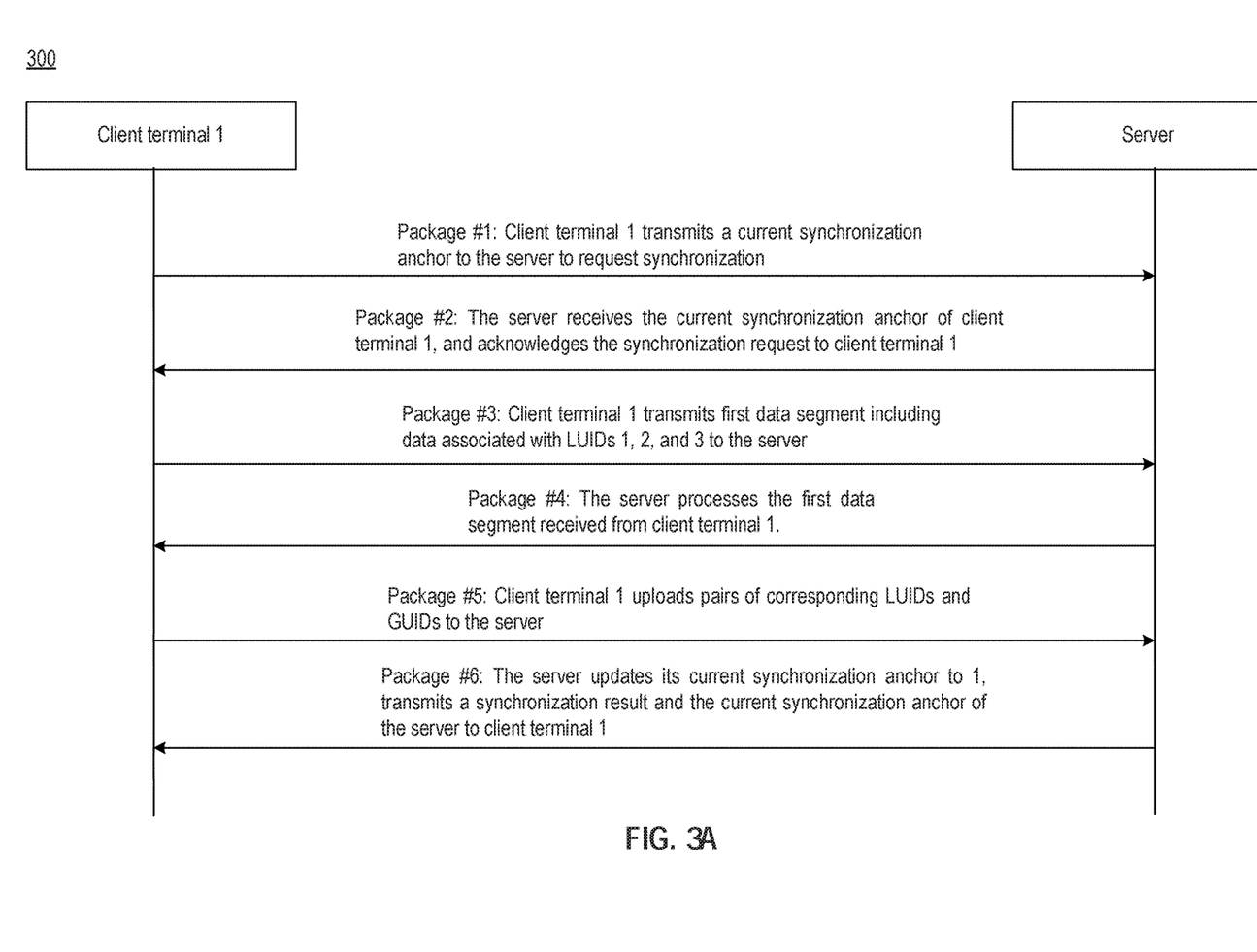
FIGS. 3A-B are flowcharts illustrating methods of data synchronization, consistent with embodiments of the present disclosure.
Figure 3B:
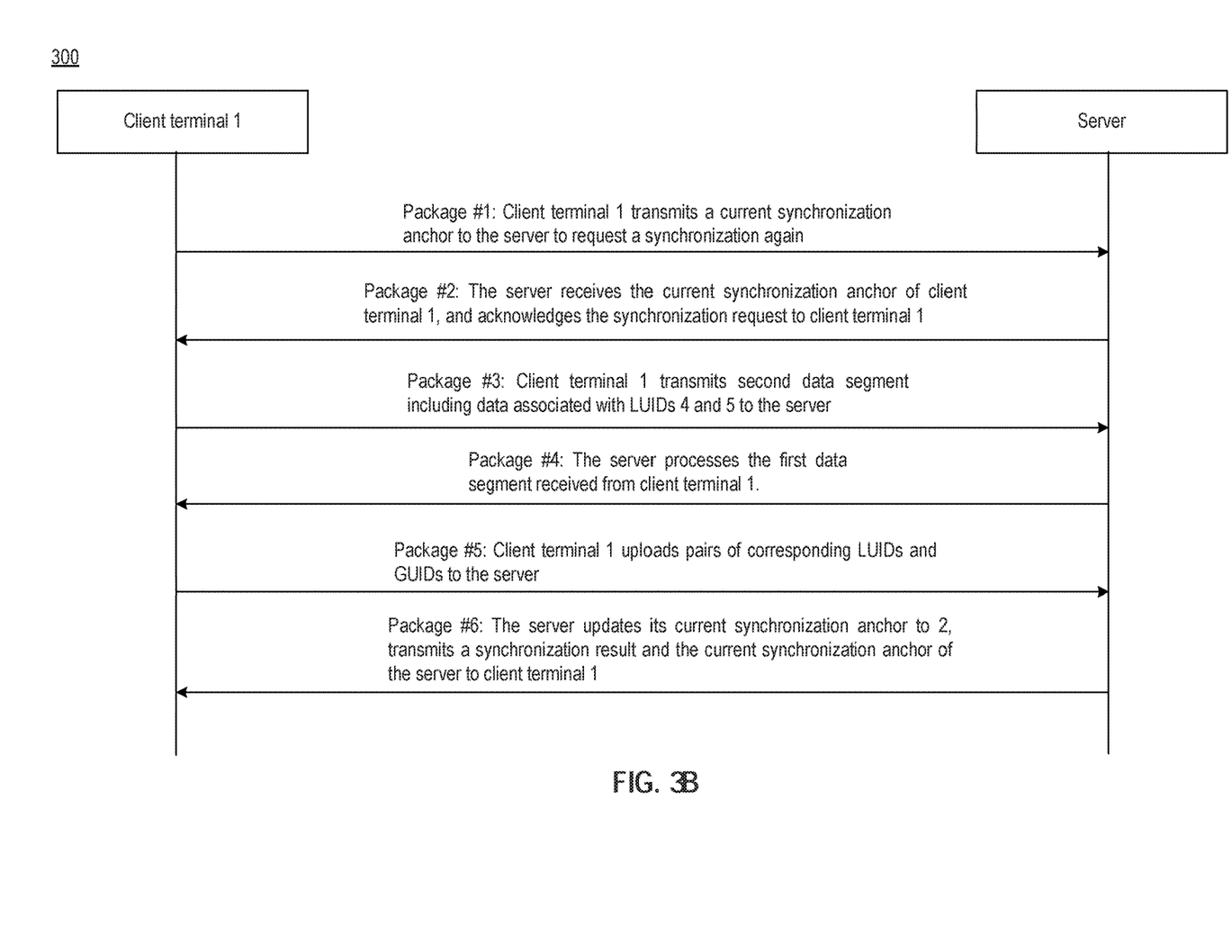

Reference is now made to FIGS. 3A and 3B, which illustrate an exemplary method 300 for data synchronization. An illustrative example will be used in describing method 300.

Suppose that a predetermined standard defines that no more than three pieces of data can be transmitted for synchronization at a time. Suppose also that a client terminal 1 is to synchronize data with the server, but that the server does not have the data stored at client terminal 1 (e.g., because the client terminal has never synchronized data with the server), and as a result the current synchronization anchors of the server and of client terminal 1 are both zero. Suppose that data to be synchronized under the current client terminal 1 is as shown in Table 1 below:

TABLE 1

| LUID | GUID | Data Content | Fingerprint |
|---|---|---|---|
| 1 | | Hello | 2GDW8g2FkDH32aaiuwLYhkN |
| 2 | | Hi | 166Fe42odlADP0sg41H4B17 |
| 3 | | Good | 3XFTqM2P6f6h2HHqca3yRoNv |
| 4 | | Ok | 3VYxYz1hNSc12w8quj14KQ7i |
| 5 | | nice | 2sq8p23Iy8IkklvA143vx5a |

Here, LUID can be an identifier of a piece of data at the client terminal, while the GUID can be an identifier of the same piece of data the server. Table 1 also shows the content of each piece of data, and the associated data fingerprint. According to the pre-determined standard, the five pieces of data can be divided into two data segments, and each data segment will be transmitted separately to the server for synchronization. The first data segment includes data associated with LUIDs 1, 2, and 3, while the second data segment includes data associated with LUIDs 4 and 5.

As shown in FIG. 3A, the synchronization of the first data segment includes six packages:

Package #1: Client terminal 1 transmits a current synchronization anchor of zero to the server to request synchronization.

Package #2: The server receives the current synchronization anchor of client terminal 1, and acknowledges the synchronization request to client terminal 1.

Package #3: Client terminal 1 transmits first data segment including data associated with LUIDs 1, 2, and 3 to the server.

Package #4: The server processes the first data segment received from client terminal 1. Since the current synchronization anchors of the client terminal 1 and of the server are both 0, there is no difference data to be delivered to client terminal 1.

Package #5: Client terminal 1 uploads pairs of corresponding LUIDs and GUIDs to the server.

Package #6: The server updates its current synchronization anchor to 1. The server also acknowledges an operation result of client terminal 1 and records a mapping relationship between the GUIDs and the LUIDs. The server also transmits a synchronization result and the current synchronization anchor of the server to client terminal 1, which then update its own current synchronization anchor accordingly to 1, to complete the synchronization of the first data segment.

After completion of packages #1-#6 of FIG. 3A, the server now stores data associated with LUIDs 1, 2, and 3, which the server also associates with GUID1, GUID2, and GUID3 respectively. The current synchronization anchor of the server has been updated to be 1. Table 2 illustrates the data stored at the server after completion of packages #1-#6 of FIG. 3A:

TABLE 2

| GUID | Data | Fingerprint |
|---|---|---|
| GUID1 | Hello | 2GDW8g2FkDH32aaiuwLYhkN |
| GUID2 | Hi | 166Fe42odlADP0sg41H4B17 |
| GUID3 | Good | 3XFTqM2P6f6h2HHqca3yRoNv |

On the other hand, the current synchronization anchor of client terminal 1 is also updated to be 1. Table 3 illustrates the data stored at client terminal 1:

TABLE 3

| LUID | GUID | Data Content | Fingerprint |
|---|---|---|---|
| 1 | GUID1 | Hello | 2GDW8g2FkDH32aaiuwLYhkN |
| 2 | GUID2 | Hi | 166Fe42odlADP0sg41H4B17 |
| 3 | GUID3 | Good | 3XFTqM2P6f6h2HHqca3yRoNv |
| 4 | | Ok | 3VYxYz1hNSc12w8quj14KQ7i |
| 5 | | nice | 2sq8p23Iy8IkklvA143vx5a |

As shown in Table 3, after the synchronization process for data of LUIDs 1, 2, and 3 has been completed, client terminal 1 also receives the GUIDs that correspond to these data. The next synchronization process will be for second data segment that includes data of LUIDs 4 and 5, as shown in FIG. 3B:

Package #1: Client terminal 1 transmits its current synchronization anchor (now set at 1) to the server to request synchronization once again.

Package #2: Server acknowledges the synchronization request to the client terminal 1.

Package #3: Client terminal 1 transmits second data segment including data of LUIDs of 4 and 5 to the server.

Package #4: The server processes the data transmitted from the client terminal 1. Since the current synchronization anchors of client terminal 1 and of the server are both 1, there is no difference data to be delivered to the client terminal 1.

Package #5: Client terminal 1 uploads the corresponding pairs of LUIDs and GUIDs to the server.

Package #6: The server updates the current synchronization anchor to 2. The server acknowledges an operation result of the client terminal 1 and records a mapping relationship between the LUIDs and the GUIDs, and then transmits a synchronization result and the current synchronization anchor (2) of the server to client terminal 1. Client terminal 1 updates its own current synchronization anchor to 2, to complete synchronization of the second data segment. Tables 4 and 5 below illustrate, respectively, the data stored at client terminal 1 and at the server after packages #1-#6 of FIG. 3B have been completed:

TABLE 4

| GUID | Data | Fingerprint |
|---|---|---|
| GUID1 | Hello | 2GDW8g2FkDH32aaiuwLYhkN |
| GUID2 | Hi | 166Fe42odlADP0sg41H4B17 |
| GUID3 | Good | 3XFTqM2P6f6h2HHqca3yRoNv |
| GUID4 | ok | 3VYxYz1hNSc12w8quj14KQ7i |
| GUID5 | nice | 2sq8p23Iy8IkklvA143vx5a |

The data stored at client terminal 1 is as shown in Table 5:

TABLE 5

| LUID | GUID | Data Content | Fingerprint |
|---|---|---|---|
| 1 | GUID1 | Hello | 2GDW8g2FkDH32aaiuwLYhkN |
| 2 | GUID2 | Hi | 166Fe42odlADP0sg41H4B17 |
| 3 | GUID3 | Good | 3XFTqM2P6f6h2HHqca3yRoNv |
| 4 | GUID4 | Ok | 3VYxYz1hNSc12w8quj14KQ7i |
| 5 | GUID5 | nice | 2sq8p23Iy8IkklvA143vx5a |

Figure 4A:
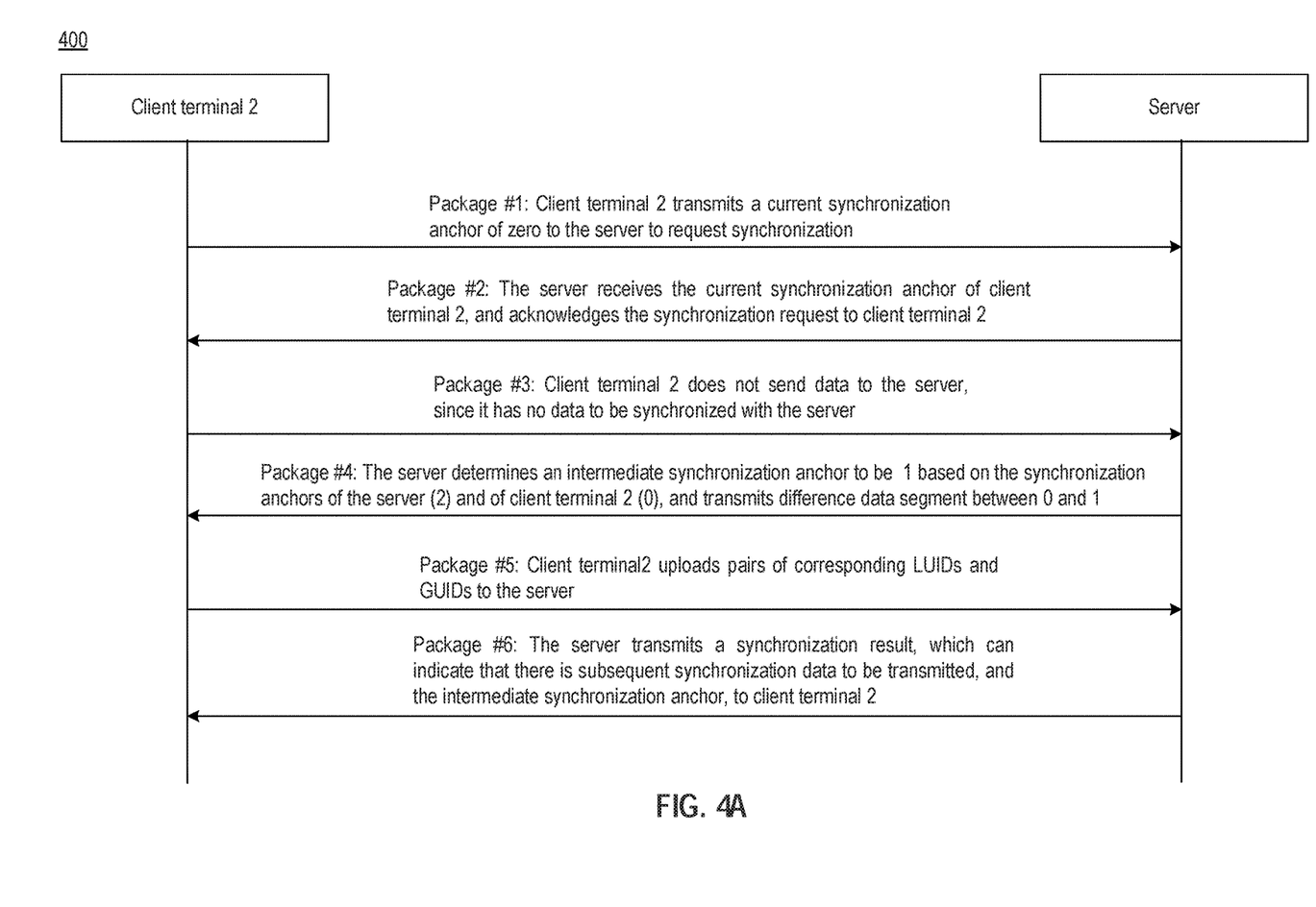
FIGS. 4A-B are flowcharts illustrating methods of data synchronization, consistent with embodiments of the present disclosure.
Figure 4B:
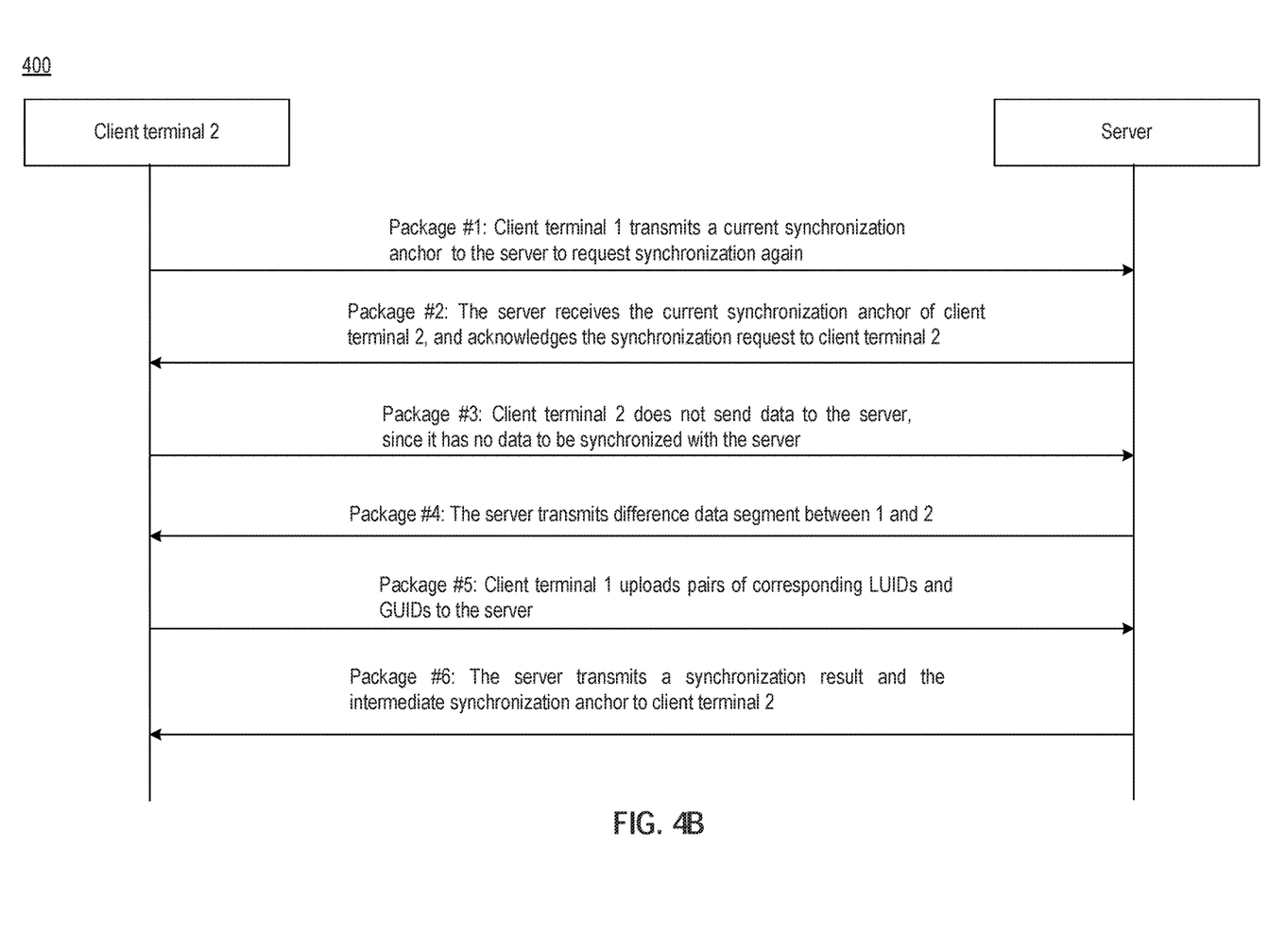

Reference is now made to FIGS. 4A and 4B, which illustrate an exemplary method 400 for data synchronization. An illustrative example will be used in describing method 400.

Suppose that the user would like to synchronize data between the server and a client terminal 2, after data synchronization has been performed between the server and client device 1, with the synchronization anchor of the server at 2 and five pieces of data being stored at the server, while the synchronization anchor of client terminal 2 is at zero. Suppose also that a predetermined standard defines that no more than three pieces of data can be transmitted for synchronization at a time. According to the pre-determined standard, the server will transmit the data in two data segments, as well as an intermediate synchronization anchor that reflects a size of the segments.

As shown in FIG. 4A, the synchronization of the first data segment includes six packages:

Package #1: Client terminal 2 transmits a current synchronization anchor of zero to the server to request synchronization.

Package #2: The server receives the current synchronization anchor of client terminal 2, and acknowledges the synchronization request to client terminal 2.

Package #3: Client terminal 2 does not send data to the server, since it has no data to be synchronized with the server.

Package #4: The server determines an intermediate synchronization anchor based on the synchronization anchors of the server (2) and of client terminal 2 (0). As the server determines that data between the synchronization anchors includes five pieces of data, which exceeds a number of data allowed under the pre-determined standard, the server can determine to divide the data into two segments, with first data segment corresponding to a difference between the synchronization anchor of client terminal 2 and the intermediate anchor. As an example, the server can determine the intermediate synchronization anchor to be 1, and the first data segment includes data of GUID1, GUID2, and GUID3.

Package #5: Client terminal 2 uploads pairs of corresponding LUIDs and GUIDs to the server.

Package #6: The server transmits a synchronization result, which can indicate that there is subsequent synchronization data to be transmitted, and the intermediate synchronization anchor, to client terminal 2, which then updates its current synchronization anchor to be 1.

After packages #1-#6 of FIG. 4A, the synchronization anchor of client terminal 2 is at 1, and the synchronization anchor of the server is at 2. The data stored at client terminal 2 is shown in Table 6:

TABLE 6

| LUID | GUID | Data Content | Fingerprint |
|---|---|---|---|
| 1 | GUID1 | Hello | 2GDW8g2FkDH32aaiuwLYhkN |
| 2 | GUID2 | Hi | 166Fe42odlADP0sg41H4B17 |
| 3 | GUID3 | Good | 3XFTqM2P6f6h2HHqca3yRoNv |

As shown in Table 6, after packages #1-#6 of FIG. 4A, client terminal 2 completes synchronization of first data segment that includes data of GUID1, GUID2, and GUID3, with the server. Moreover, the synchronization result, transmitted by the server during package #6, also indicates that there is subsequent data (second data segment) to be synchronized. As a result, client terminal 2 can initiate a second synchronization request for the second data segment. FIG. 4B illustrates the six packages of synchronization of the second data segment:

Package #1: Client terminal 2 transmits a current synchronization anchor (1) to the server to request synchronization.

Package #2: The server receives the current synchronization anchor of client terminal 2, and acknowledges the synchronization request to client terminal 2.

Package #3: Client terminal 2 does not send data to the server, as it has no data to be synchronized with the server.

Package #4: The server determines that the remaining data to be transmitted, based on the intermediate synchronization anchor (1) and the synchronization anchor of the server (2), is data of GUIDs 4 and 5. Since a size of the data is below the predetermine threshold (three pieces of data), the server can determine that there is no need to further divide the data, and can transmit second data segment including data of GUIDs 4 and 5 to client terminal 2.

Package #5: Client terminal 2 uploads pairs of corresponding LUIDs and GUIDs to the server.

Package #6: The server transmits a synchronization result, which can indicate that there is subsequent synchronization data to be transmitted, and the synchronization anchor of the server (2), to client terminal 2, which then updates its current synchronization anchor to be 2. At the end of packages #1-#6 of FIG. 4B, the data stored at client terminal 2 is as shown in Table 7:

The data stored at client terminal 1 is as shown in Table 5:

TABLE 7

| LUID | GUID | Data Content | Fingerprint |
| --- | --- | --- | --- |
| 1 | GUID1 | Hello | 2GDW8g2FkDH32aaiuwLYhkN |
| 2 | GUID2 | Hi | 166Fe42odlADP0sg41H4B17 |
| 3 | GUID3 | Good | 3XFTqM2P6f6h2HHqca3yRoNv |
| 4 | GUID4 | Ok | 3VYxYz1hNSc12w8quj14KQ7i |
| 5 | GUID5 | nice | 2sq8p23Iy8IkklvA143vx5a |

There can be a number of indicators that indicates the synchronization process has been completed, such as the synchronization anchors of the server and of client terminal 2 being identical. Moreover, the synchronization result transmitted in package #6 can also indicate that the synchronization process has been completed.

Figure 5:
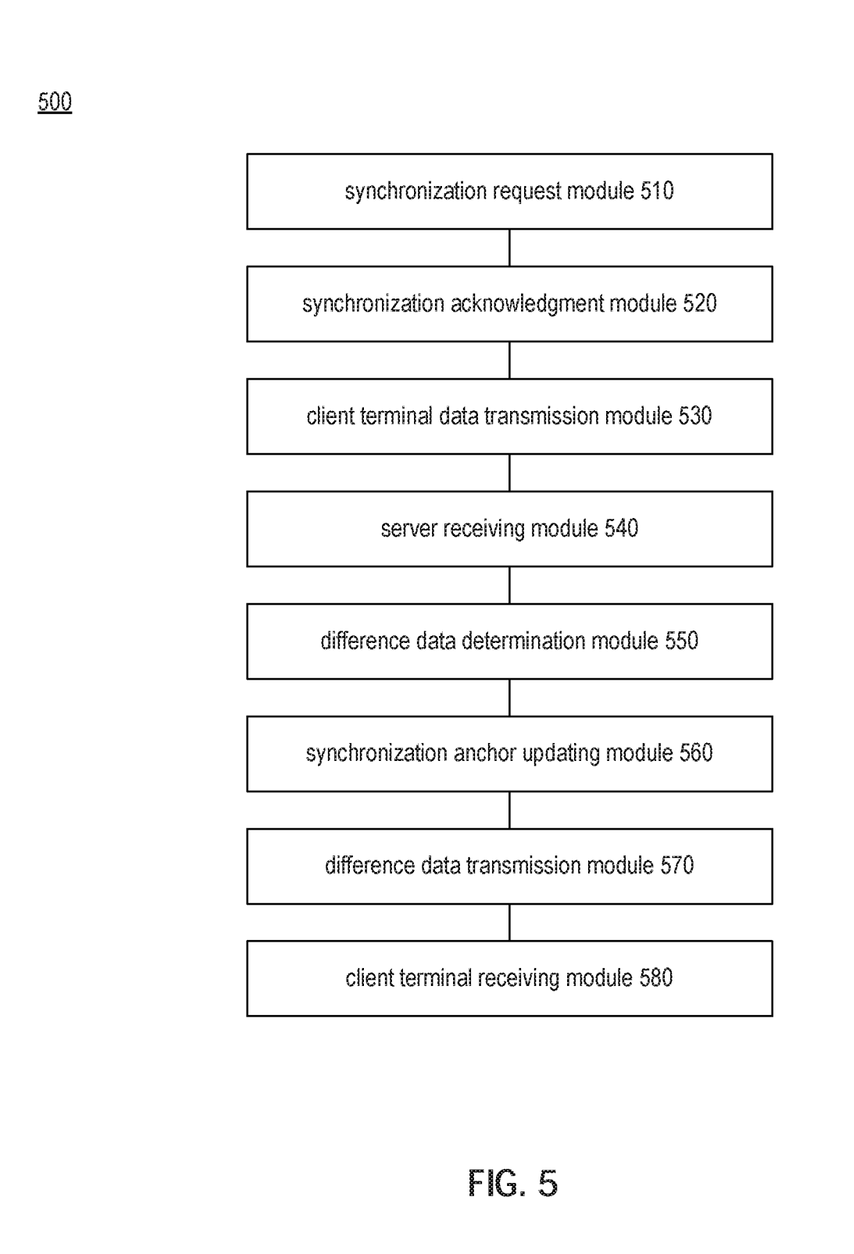
FIG. 5 is a schematic diagram illustrating a system for data synchronization, consistent with embodiments of the present disclosure.

FIG. 5 is a schematic diagram illustrating an exemplary system 500 for data synchronization, consistent with embodiments of the present disclosure. In some embodiments, various components of system 500 can perform one or more steps of methods 200 and 280 of FIGS. 2A-B, method 300 of FIGS. 3A-B, and method 400 of FIGS. 4A-B. As shown in FIG. 5, system 500 includes a synchronization request module 510, a synchronization acknowledgment module 520, a client terminal data transmission module 530, a server receiving module 540, a difference data determination module 550, a synchronization anchor updating module 560, a difference data transmission module 570, and a client terminal receiving module 580.

Synchronization request module 510 can be executed on a client terminal, and can transmit a synchronization request and a current synchronization anchor of the client terminal to a server. Synchronization request module 510 can perform, for example, steps S210 of method 200, S201 of method 280, and can generate and transmit package #1 in methods 300 and 400.

Synchronization acknowledgement module 520 can be executed on the server and can acknowledge the synchronization request of the client terminal and receive the current synchronization anchor of the client terminal. Synchronization acknowledgement module 520 can perform, for example, steps S220 of method 200, S202 of method 280, and can generate and transmit package #2 in methods 300 and 400.

Client terminal data transmission module 530 can be executed on the client terminal and can transmit data to the server for synchronization. In a case where a size of the data exceeds a predetermined threshold, client terminal data transmission module 530 can divide the data into data segments of sizes not exceeding the threshold, and transmit each data segment separately for synchronization. Client terminal data transmission module 530 can perform, for example, steps S230 of method 200, S203 of method 280, and can generate and transmit package #3 in method 300.

Server receiving module 540 can be executed on the server and can receive and process the data segment transmitted by the client terminal. Server receiving unit 540 can perform, for example, at least part of steps S240 of method 200 and S204 of method 280, and can generate and transmit package #4 in method 300.

Difference data determination module 550 can be executed on the server and can determine difference data between the client terminal and the server that corresponds to a difference between the current synchronization anchor of the client terminal and the current synchronization anchor of the server. Difference data determination module 550 can perform, for example, at least part of steps S240 of method 200 and S204 of method 280.

Synchronization anchor updating module 560 can be executed on the server and can update the current synchronization anchor of the server and transmit the current synchronization anchor of the server to the client terminal, which enables the client terminal to update its own synchronization anchor to match with the server's synchronization anchor. In some embodiments, synchronization anchor updating module 560 can increment the current synchronization anchor of the server each time the server receives data from the client terminal for synchronization. Synchronization anchor updating module 560 can perform, for example, steps S250 of method 200 and S205 of method 280.

Difference data transmission module 570 can be executed on the server and can transmit difference data to the client terminal for synchronization. In a case where a size of the difference data exceeds a predetermined threshold, difference data transmission module 570 can divide the difference data into data segments of sizes not exceeding the threshold, and transmit each data segment separately for synchronization. Difference data transmission module 570 can also generate an intermediate synchronization anchor based on the current synchronization anchors of the client terminal and of the server, and transmit difference a data segment that corresponds to a difference between the synchronization anchor of the client terminal and the intermediate synchronization anchor. Difference data transmission module 570 can also transmit the intermediate synchronization anchor to the client terminal, which can then update its synchronization anchor to match with the intermediate synchronization anchor. Difference data transmission module 570 can perform, for example, steps S260 of method 200, S206 of method 280, and can generate and transmit package #4 in method 400.

Client terminal receiving module 580 can be executed on the client terminal and can receive difference data transmitted by the server, and update its synchronization anchor.

Client terminal receiving module 580 can perform, for example, steps S270 of method 200 and S207 of method 280.

With embodiments of the present disclosure, the synchronization data can be divided into segments, and separate synchronization processes can be performed for each data segment. As a result, the synchronization process can become more manageable and more stable even when operating uncertain network conditions.

Other embodiments of the present disclosure will be apparent to those skilled in the art from consideration of the specification disclosed here. This application is intended to cover any variations, uses, or adaptations of embodiments of the present disclosure following the general principles thereof and including such departures from the present disclosure as come within known or customary practice in the art. It is intended that the specification and examples be considered as exemplary only.

What is claimed is:

1. A method for data synchronization, the method being performed by a server, comprising:
   receiving, from a client terminal, a synchronization request and information about a synchronization anchor of the client terminal;
   determining, based on the synchronization anchor of the client terminal and a synchronization anchor of the server, difference data to be synchronized with the client terminal;
   determining whether a size of the difference data exceeds a threshold; and
   responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

2. The method of claim 1, further comprising:
   determining an intermediate synchronization anchor based on the synchronization anchor of the client terminal and the synchronization anchor of the server;
   transmitting, to the client terminal, a first data segment that corresponds to a difference between the synchronization anchor of the client terminal and the intermediate synchronization anchor; and
   transmitting, to the client terminal, the intermediate synchronization anchor, wherein transmission of the intermediate synchronization anchor enables the client terminal to update the synchronization anchor of the client terminal to match with the intermediate synchronization anchor.

3. The method of claim 2, further comprising:
   transmitting, to the client terminal, a first message to indicate that more data is to be transmitted to the client terminal after the transmission of the first data segment.

4. The method of claim 2, further comprising:
   transmitting, to the client terminal, a second data segment that corresponds to a difference between the intermediate synchronization anchor and the synchronization anchor of the server; and
   transmitting, to the client terminal, the synchronization anchor of the server, wherein transmission of the synchronization anchor of the server enables the client terminal to update the synchronization anchor of the client terminal to match with the synchronization anchor of the server.

5. The method of claim 1, further comprising:
   updating the intermediate synchronization anchor based on at least one of: an updated synchronization anchor of the server and an updated synchronization anchor of the client terminal.

6. The method of claim 1, further comprising:
   receiving, from the client terminal, data to be synchronized with the server; and
   updating the synchronization anchor of the server based on a size of received data.

7. The method of claim 6, wherein the data to be synchronized with the server is transmitted in a plurality of data segments, wherein a size of each of the plurality of the difference data segments does not exceed the threshold, and wherein the synchronization anchor is updated when receiving each of the plurality of data segments.

8. The method of claim 6, further comprising:
   receiving, from the client terminal, a second message to indicate that more data is to be received from the client terminal after the receiving, from the client terminal, the data to be synchronized with the server.

9. The method of claim 1, wherein the synchronization anchor of the server is independent from the synchronization anchor of the client terminal before receiving, from the client terminal, the synchronization request and information about the synchronization anchor of the client terminal.

10. A server for data synchronization, the server comprising:
    a memory that stores a set of instructions; and
    one or more processors configured to execute the instructions to cause the server to perform:
       receiving, from a client terminal, a synchronization request and information about a synchronization anchor of the client terminal;
       determining, based on the synchronization anchor of the client terminal and a synchronization anchor of the server, difference data to be synchronized with the client terminal;
       determining whether a size of the difference data exceeds a threshold; and
       responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

11. The server of claim 10, wherein the one or more processors are configured to execute the instructions to cause the server to perform:
    determining an intermediate synchronization anchor based on the synchronization anchor of the client terminal and the synchronization anchor of the server;
    transmitting, to the client terminal, a first data segment that corresponds to a difference between the synchronization anchor of the client terminal and the intermediate synchronization anchor; and
    transmitting, to the client terminal, the intermediate synchronization anchor, wherein transmission of the intermediate synchronization anchor enables the client terminal to update the synchronization anchor of the client terminal to match with the intermediate synchronization anchor.

12. The server of claim 11, wherein the one or more processors are configured to execute the instructions to cause the server to perform:

transmitting, to the client terminal, a first message to indicate that more data is to be transmitted to the client terminal after the transmission of the first data segment.

13. The server of claim 11, wherein the one or more processors are configured to execute the instructions to cause the server to perform:
    transmitting, to the client terminal, a second data segment that corresponds to a difference between the intermediate synchronization anchor and the synchronization anchor of the server; and
    transmitting, to the client terminal, the synchronization anchor of the server, wherein transmission of the synchronization anchor of the server enables the client terminal to update the synchronization anchor of the client terminal to match with the synchronization anchor of the server.

14. The server of claim 10, wherein the one or more processors are configured to execute the instructions to cause the server to perform:
    updating the intermediate synchronization anchor based on at least one of: an updated synchronization anchor of the server and an updated synchronization anchor of the client terminal.

15. The server of claim 10, wherein the one or more processors are configured to execute the instructions to cause the server to perform:
    receiving, from the client terminal, data to be synchronized with the server; and
    updating the synchronization anchor of the server based on a size of received data.

16. The server of claim 10, wherein the one or more processors are configured to execute the instructions to cause the server to perform:
    receiving, from the client terminal, data to be synchronized with the server; and
    updating the synchronization anchor of the server based on a size of received data.
    wherein the data to be synchronized with the server is transmitted in a plurality of data segments, wherein a size of each of the plurality of the difference data segments does not exceed the threshold, and wherein the synchronization anchor is updated when receiving each of the plurality of data segments.

17. A non-transitory computer readable medium that stores a program that, when executed by a processor, causes the processor to perform a method for data synchronization, the method comprising:
    receiving, from a client terminal, a synchronization request and information about a synchronization anchor of the client terminal;
    determining, based on the synchronization anchor of the client terminal and a synchronization anchor of the server, difference data to be synchronized with the client terminal;
    determining whether a size of the difference data exceeds a threshold; and
    responsive to determining that a size of the difference data exceeds the threshold, transmitting the difference data to the client terminal in a plurality of difference data segments, wherein a size of each of the plurality of the difference data segments does not exceed the threshold, and wherein each of the plurality of the difference data segments is to be synchronized separately with the client terminal.

18. The medium of claim 17, wherein the method further comprises:
    determining an intermediate synchronization anchor based on the synchronization anchor of the client terminal and the synchronization anchor of the server;
    transmitting, to the client terminal, a first data segment that corresponds to a difference between the synchronization anchor of the client terminal and the intermediate synchronization anchor; and
    transmitting, to the client terminal, the intermediate synchronization anchor, wherein transmission of the intermediate synchronization anchor enables the client terminal to update the synchronization anchor of the client terminal to match with the intermediate synchronization anchor.

19. The medium of claim 18, wherein the method further comprises:
    transmitting, to the client terminal, a first message to indicate that more data is to be transmitted to the client terminal after the transmission of the first data segment.

20. The medium of claim 18, wherein the method further comprises:
    transmitting, to the client terminal, a second data segment that corresponds to a difference between the intermediate synchronization anchor and the synchronization anchor of the server; and
    transmitting, to the client terminal, the synchronization anchor of the server, wherein transmission of the synchronization anchor of the server enables the client terminal to update the synchronization anchor of the client terminal to match with the synchronization anchor of the server.

* * * * *